No. 700,864. Patented May 27, 1902.
B. WEINBERG.
DETACHABLE ALARM FOR KETTLES.
(Application filed Mar. 25, 1902.)
(No Model.)

Witnesses:
H. B. Davis
J. L. Hutchinson.

Inventor:
Bernhard Weinberg
by Noyes & Herriman
Attys

United States Patent Office.

BERNHARD WEINBERG, OF BOSTON, MASSACHUSETTS, ASSIGNOR OF ONE-HALF TO LOUIS JACOBSON, OF CAMBRIDGE, MASSACHUSETTS.

DETACHABLE ALARM FOR KETTLES.

SPECIFICATION forming part of Letters Patent No. 700,864, dated May 27, 1902.

Application filed March 25, 1902. Serial No. 99,852. (No model.)

*To all whom it may concern:*

Be it known that I, BERNHARD WEINBERG, of Boston, county of Suffolk, and State of Massachusetts, have invented an Improvement in Detachable Alarms for Kettles, of which the following description, in connection with the accompanying drawings, is a specification, like characters on the drawings representing like parts.

This invention relates to a detachable alarm for kettle-covers, which is adapted to be sounded by the escaping steam from the kettle when the water therein reaches the boiling-point.

In various cooking utensils it is especially desirable to have some device attached thereto which will notify the cook when the water has reached the boiling-point; and the object of my invention is to produce a simple, effective, and inexpensive device, which may be readily applied to the ordinary sheet-metal cover of the kettle, adapted to sound an alarm when the water boils and incidentally utilize as the knob or handle by which the cover may be removed. I carry out this object by employing a tubular stem which is screw-threaded at its lower end and is provided with a discoidal whistle at its upper end, which is seated in a support, the latter being arranged between the whistle and the cover to which it may be applied, so that when a nut is screwed onto the threaded portion of the stem the whistle will be securely clamped in place.

For a more complete understanding of my invention reference is made to the accompanying drawings, in which—

Figure 1:
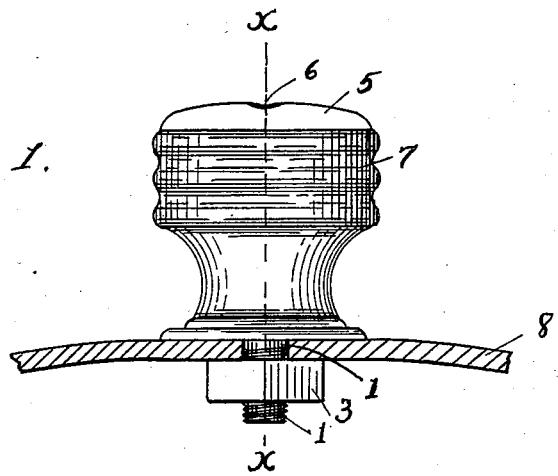
Figure 2:
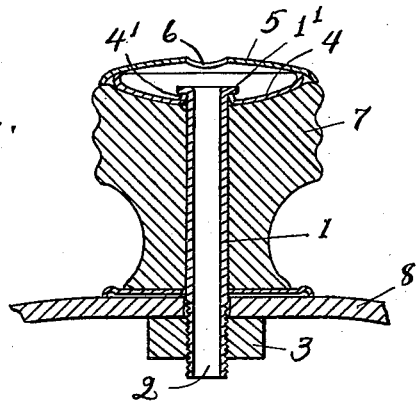
Figure 3:
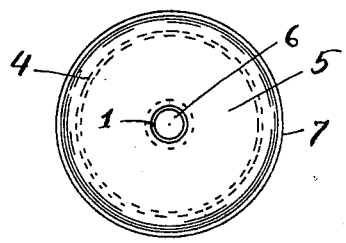

Figure 1 is an elevation of my device, showing its application to a cover. Fig. 2 is a central cross-section on the line x x of Fig. 1. Fig. 3 is a top plan view thereof.

My device consists of a stem 1, having a passage 2 therethrough, the lower end of said stem being screw-threaded and provided with a nut 3. The upper end of said stem is provided with a discoidal-shaped whistle, which consists of two oppositely-arranged concave metal disks 4 and 5, which are connected at their edges to provide a whistle-chamber. In constructing the whistle and connecting it to the tube the disk 4 is stamped out and a central aperture is punched therethrough, pressing the metal inwardly to form a lip 4'. The tube 1 is then passed through said aperture, and its end is shaped to form a flange 1', which rests on top of lip 4'. The upper disk 5 is provided with a central aperture 6, which is of greater diameter than that of the passage through tube 1, for the reasons hereinafter explained. The edges of the disks are then connected by crimping or soldering. A whistle-support 7, which is preferably in the form of an ordinary wooden knob, is interposed between the under disk 4 of the whistle and the cover 8, to which the whistle is or may be attached, said tube passing longitudinally through the center of said support. The upper side of the support 7 is provided with a concave circular seat, which is filled by the lower part of the whistle, the upper part thereof having its edges extended down to the support, so as to give a finished appearance thereto, as indicated in the drawings.

In attaching the whistle to the cover the threaded end of the stem is passed through an aperture therein and the nut 3 is screwed onto said threaded end, so that it engages the inner side of the cover and clamps the whole device firmly in position, as shown in Fig. 2, drawing the flanged end 1' of the tube against lip 4' and in turn drawing the whistle into its seat in the support and the latter against the cover.

The operation of my device will be obvious. When the water in the utensil boils, the escaping steam will pass through the tubular stem, causing the whistle to be sounded.

The object of providing the inwardly-projecting lip 4' is to prevent the water of condensation which may collect in the chamber before the water actually boils from running down into the stem and preventing the whistle from being sounded as soon as the water boils. The upper aperture 6 is slightly larger than the passage, or at least the end of the passage through the tube 1, so that the comparatively free escape of steam from the whistle-chamber is permitted, and the rapid discharge of a jet of steam into said chamber will not be interfered with by back pressure. By the time sufficient water has collected in said chamber to overflow lip 4 and the end of tube 1 the steam will usually have acquired sufficient pressure to prevent the water from interfering with the sounding of the whistle. The whistle will always be sounded, however, as soon as a comparatively slight pressure is generated.

From the foregoing description it will be apparent that I have produced a simple and inexpensive device which is perfectly adapted for the purpose intended.

Having described my invention, what I claim, and desire to secure by Letters Patent, is as follows:

1. As a new article of manufacture, a detachable alarm for kettles consisting of a tubular stem having a discoidal whistle attached to one end thereof, a support having a seat for the whistle in one end and a hole through which said stem passes, said stem projecting beyond the opposite end of said support, the end of the projecting portion being screw-threaded and a clamping-nut on said screw-threaded end, substantially as described.

2. As a new article of manufacture, a detachable alarm for kettles comprising a pair of centrally-perforated concave disks which are oppositely arranged and connected at their edges to form a chamber, a support having a seat in one end in which one of said disks is located, and a hole which passes through it from end to end, a tube having a circumferentially-flanged end, said tube extending through the hole of said support and the perforation of the adjacent disk, the flanged end of said disk being located in said chamber and its opposite end projecting beyond said support and being screw-threaded, and a nut on said threaded end, substantially as described.

3. As a new article of manufacture, a detachable alarm for kettles comprising a pair of centrally-perforated concave disks which are oppositely arranged and connected at their edges to form a chamber, one of said disks having an annular lip surrounding its perforation which projects into said chamber, a support having a seat in one end in which said latter disk is located and a hole which passes through it from end to end, a tube having a circumferentially-flanged end, said tube extending through the hole of said support and the perforation of the adjacent disk, its flanged end being located within the chamber and its opposite end projecting beyond the support and being screw-threaded, and a nut on said threaded end, substantially as described.

In testimony whereof I have signed my name to this specification in the presence of two subscribing witnesses.

BERNHARD WEINBERG.

Witnesses:
 LOUIS H. HARRIMAN,
 J. L. HUTCHINSON.